United States Patent
Bae et al.

(10) Patent No.: US 9,882,200 B2
(45) Date of Patent: Jan. 30, 2018

(54) HIGH ENERGY AND POWER LI-ION BATTERY HAVING LOW STRESS AND LONG-TERM CYCLING CAPACITY

(71) Applicant: PALO ALTO RESEARCH CENTER INCORPORATED, Palo Alto, CA (US)

(72) Inventors: Chang-Jun Bae, Palo Alto, CA (US); Eric J. Shrader, Belmont, CA (US); Ashish Manandhar, Palo Alto, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 639 days.

(21) Appl. No.: 14/448,590

(22) Filed: Jul. 31, 2014

(65) Prior Publication Data
US 2016/0036047 A1 Feb. 4, 2016

(51) Int. Cl.
| | |
|---|---|
| *H01M 4/00* | (2006.01) |
| *H01M 4/131* | (2010.01) |
| *H01M 4/525* | (2010.01) |
| *H01M 4/04* | (2006.01) |
| *H01M 4/1391* | (2010.01) |
| *H01M 4/36* | (2006.01) |
| *H01M 4/505* | (2010.01) |
| *H01M 4/58* | (2010.01) |
| *H01M 4/02* | (2006.01) |

(52) U.S. Cl.
CPC ......... *H01M 4/131* (2013.01); *H01M 4/0411* (2013.01); *H01M 4/1391* (2013.01); *H01M 4/362* (2013.01); *H01M 4/525* (2013.01); *H01M 4/505* (2013.01); *H01M 4/5825* (2013.01); *H01M 2004/021* (2013.01)

(58) Field of Classification Search
CPC ...................................................... H01M 4/00
See application file for complete search history.

(56) References Cited

U.S. PATENT DOCUMENTS

| | | |
|---|---|---|
| 3,195,865 A | 7/1965 | Harder |
| 3,382,534 A | 5/1968 | Veazey |
| 3,583,678 A | 6/1971 | Harder |
| 3,752,616 A | 8/1973 | Matsui et al. |

(Continued)

FOREIGN PATENT DOCUMENTS

| | | |
|---|---|---|
| EP | 0802034 | 10/1997 |
| EP | 1757429 | 2/2007 |

(Continued)

OTHER PUBLICATIONS

Zheng et al., "A comprehensive understanding of electrode thickness effects on the electrochemical performances of Li-ion battery cathodes," Electrochimica Acta 71 (2012), pp. 258-265.

(Continued)

*Primary Examiner* — Jacob Marks
(74) *Attorney, Agent, or Firm* — Marger Johnson

(57) ABSTRACT

A battery has an anode, a separator adjacent the anode, and a cathode adjacent the separator opposite the anode, the cathode comprising interdigitated stripes of two different types, one of the types forming pore channels or porous structure and one of the types being more compressible than others type.

8 Claims, 4 Drawing Sheets

(56) References Cited

U.S. PATENT DOCUMENTS

| | | | |
|---|---|---|---|
| 3,860,036 A | 1/1975 | Newman, Jr. |
| 3,949,970 A | 4/1976 | ter Braak |
| 4,112,520 A | 9/1978 | Gilmore |
| 4,222,671 A | 9/1980 | Gilmore |
| 4,511,528 A | 4/1985 | Kudert et al. |
| 5,094,793 A | 3/1992 | Schrenk et al. |
| 5,143,681 A | 9/1992 | Daubenbuchel et al. |
| 5,154,934 A | 10/1992 | Okamoto |
| 5,628,950 A | 5/1997 | Schrenk et al. |
| 5,843,385 A | 12/1998 | Dugan |
| 5,851,562 A | 12/1998 | Haggard et al. |
| 5,882,694 A | 3/1999 | Guillemette |
| 6,109,006 A | 8/2000 | Hutchinson |
| 6,676,835 B2 | 1/2004 | O'Connor et al. |
| 6,981,552 B2 | 1/2006 | Reddy et al. |
| 7,090,479 B2 | 8/2006 | Kegasawa et al. |
| 7,690,908 B2 | 4/2010 | Guillemette et al. |
| 7,700,019 B2 | 4/2010 | Lavoie et al. |
| 7,765,949 B2 | 8/2010 | Fork et al. |
| 7,780,812 B2 | 8/2010 | Fork et al. |
| 7,799,371 B2 | 9/2010 | Fork et al. |
| 7,883,670 B2 | 2/2011 | Tonkovich et al. |
| 7,922,471 B2 | 4/2011 | Fork et al. |
| 8,206,025 B2 | 6/2012 | Natarajan |
| 2002/0074972 A1 | 6/2002 | Narang et al. |
| 2002/0176538 A1 | 11/2002 | Wimberger-Friedl et al. |
| 2003/0082446 A1 | 5/2003 | Chiang et al. |
| 2003/0111762 A1 | 6/2003 | Floyd et al. |
| 2003/0189758 A1 | 11/2003 | Baer et al. |
| 2007/0279839 A1 | 12/2007 | Miller |
| 2010/0003603 A1 | 1/2010 | Chiang et al. |
| 2010/0239700 A1 | 9/2010 | Winroth |
| 2012/0031487 A1 | 2/2012 | Kuang et al. |
| 2012/0153211 A1 | 6/2012 | Fork et al. |
| 2012/0156364 A1 | 6/2012 | Fork et al. |
| 2012/0315538 A1* | 12/2012 | Chiang ............... H01M 4/0411 429/209 |

FOREIGN PATENT DOCUMENTS

| | | |
|---|---|---|
| EP | 2056352 | 5/2009 |
| EP | 2466594 | 6/2012 |
| JP | 9183147 | 7/1997 |
| JP | 2006326891 | 12/2006 |
| WO | 0121688 | 3/2001 |

OTHER PUBLICATIONS

Siegel, et al, "Expansion of Lithium Ion Pouch Cell Batteries: Observations from Neutron Imaging," Journal of The Electrochemical Society, 160 (8), A1031-A1038 (2013).

Cannarella, et al, "Ion transport restriction in mechanically strained separator membranes," Journal of Power Sources 226 (2013), pp. 149-155.

Peabody, et al. The role of mechanically induced separator creep in lithium-ion battery capacity fade, Journal of Power Sources 196 (2011), pp. 8147-8153.

Fergus, et al. "Recent Developments in Cathode Materials for Lithium Ion Batteries," Journal of Power Sources, Elsevier SA, Ch. vo. 195. No. 4, Feb. 15, 2010, pp. 939-955, XP026693512.

European Search Report, dated Apr. 14, 2014, EP Application No. 13198599.6, 7 pages.

\* cited by examiner

HIGH ENERGY AND POWER LI-ION BATTERY HAVING LOW STRESS AND LONG-TERM CYCLING CAPACITY

RELATED APPLICATIONS

The application is related to US Patent Publication No. 20120156364; US Patent Publication No. 20120153211; U.S. patent application Ser. No. 13/727,927; U.S. patent application Ser. No. 13/727,993; U.S. patent application Ser. No. 13/727,960; and U.S. patent application Ser. No. 13/728,016.

BACKGROUND

The move to alternative energy sources for electric devices and electric vehicles has increased the demand for better battery technology. Batteries typically store energy in a particular volume, where the density of the energy is referred to as the volumetric energy density. Increasing the volumetric energy density of batteries typically involves making thick electrodes. This decreases total volume of inactive materials such as separator and current collectors, thereby increasing the volumetric energy density.

However, thick electrodes undergo mechanical stresses. Sources of the mechanical stresses come from stack pressure that ensures the adhesion between the electrodes and the current collectors. Another source of mechanical stress lies in internal strain resulted from the expansion and contraction of the battery electrode as the lithium ions intercalate and de-intercalate into and out of the electrode material during charging and discharging. This results in severe fading of long-term cycling capacity in thick battery electrodes.

In addition, severe electrolyte depletion with increasing thickness occurs due to long lithium ion (Li-ion) diffusion lengths and poor Li-ion conductivity in complex microstructure electrodes. This results in less material utilization, reducing the volumetric energy density.

DETAILED DESCRIPTION OF THE EMBODIMENTS

Figure 1:
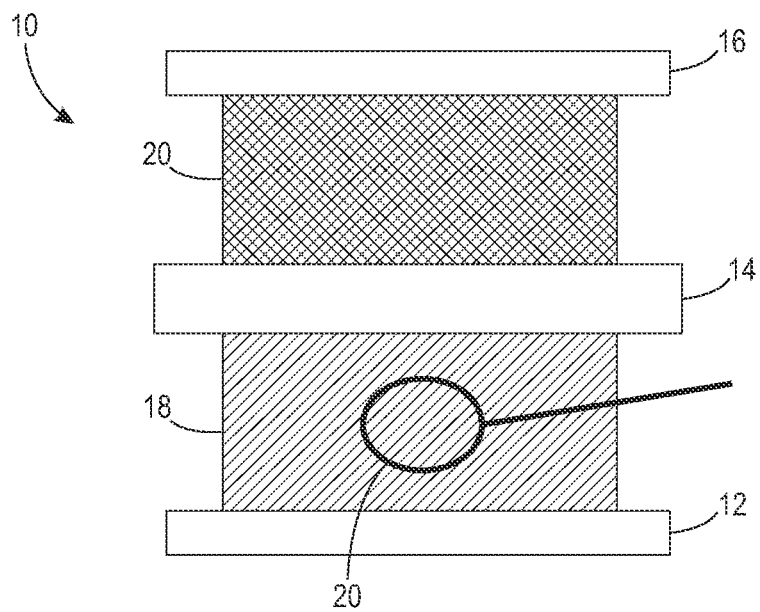
FIG. 1 shows a prior art embodiment of a battery structure.
Figure 2:
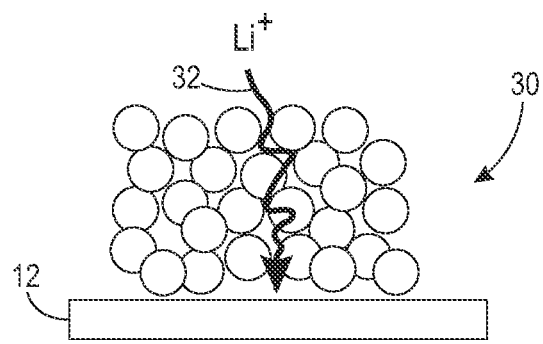
FIG. 2 shows an embodiment of a thin, but low energy and high power electrode.

FIG. 1 shows a typical Li-ion cell 10, in which the active material consists of lithium-cobalt-oxide ($LiCoO_2$) for the cathode 18 and graphite 20 for the anode part. The inactive components consist of the electrolyte, binder, carbon, separator 14, and positive and negative current collectors 12 and 16. Local depletion of ions in the liquid electrolyte can occur with an electrically conductive, dense electrode. This phenomenon will be more severe when the higher currents are applied, where the discharge capacity seriously decreases. Thinner electrodes, shown in FIG. 2, approximately 100 micrometers, with shorter Li-ion diffusion length 32 have been employed in conventional Li-ion batteries to diminish this electrolyte depletion effect.

Figure 3:
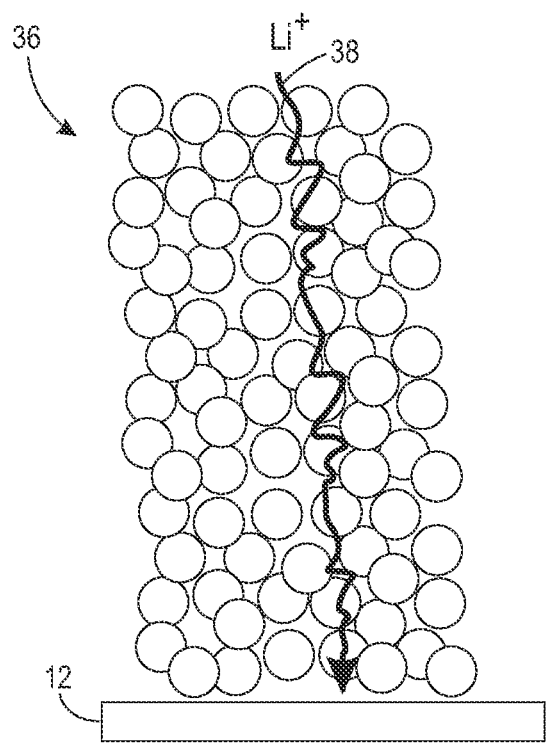
FIG. 3 shows an embodiment of a thick, but high energy and low power electrode.

For current EV applications, large batteries are produced by stacking many layers of conventional thin electrodes. This results in a large proportion of inactive components in these batteries. Reducing the amount of expensive separators and heavy current collectors would greatly reduce expense and the amount of inactive materials present. FIG. 3 shows a Li-ion transport path 38 that using thicker electrodes such as 36 provides a direct, practical solution to increase volumetric energy density of Li-ion batteries in a manner that increases the proportion of active material to inactive material. However, FIG. 3 shows an issue with the thicker electrodes such as 36. Because of the longer diffusion paths such as 38, the electrolyte depletion increases due to poor Li-ion conductivity in complex microstructures in the diffusion paths. Current industrial fabrication processes limit the improvements that can be made to electrode architecture.

Figure 4:
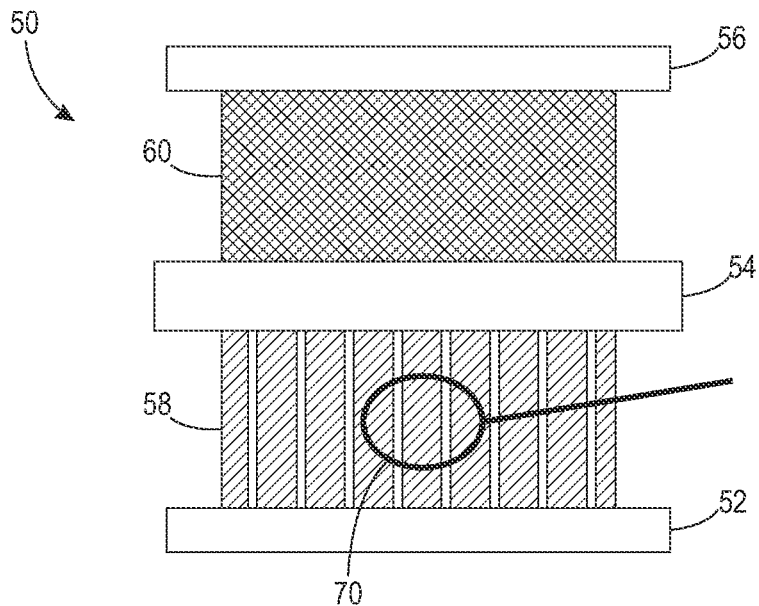
FIG. 4 shows an embodiment of a battery having a cathode or an anode with interdigitated structures.
Figure 5:
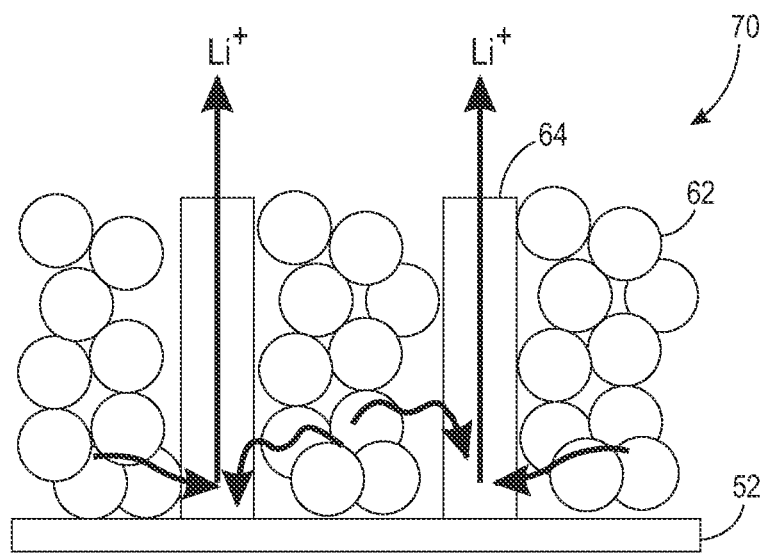
FIG. 5 shows an embodiment of a cathode or an anode having a pore channel or different microstructures.

U.S. patent application Ser. No. 13/727,960 discusses a solution to the Li-ion transport path by creating pore channels or a porous structure. Micro co-extrusion print heads create conducting contacts and spaced interdigitated stripes by feeding multiple viscous, particle-filled pastes into a print head that allows flows of separate fluids to alternately converge. Because of the laminar flow in the above micro co-extrusion print head, the two materials generally do not mix. FIG. 4 shows an exploded view of a portion 70 of the interdigitated structure of FIG. 5.

One of the materials in the interdigitated stripes forms a pore channel or a porous structure as a microstructure within the electrode structure. The formation of the stripes and materials used to cause this structure will be discussed in more detail further. The pore channels such as 64 play a critical role as a sink or source to facilitate Li-ion motion. These channels cause shorter and much less tortuous paths when the Li-ions are transferred from the other material 62 through the pore channels. This allows the use of thicker electrodes than would otherwise be possible. The resulting cathodes have high power and volumetric energy density.

Generally, the process involves mixing a first active material with a solvent to produce a first electrode active material. The solvent allows the material to be thinned to allow it to flow more easily through the co-extrusion device. The first active material and the second active material may be generally the same material, but of different concentrations. For purposes of this discussion, the first material will be the material having a higher concentration and may have a higher density. The second material may be more porous than the first material. The interdigitated stripes of materials with different porosity hav some advantages.

One of the issues that occur with batteries is the expansion of the materials during charging and discharging. While a stack pressure is established on the tightly packed jellyroll structure in a metal canister or foil pouch, internal strain originates from the expansion and contraction of the battery electrode as lithium ion intercalate and de-intercalate into and out of the electrode materials during charging and discharging. One advantage of the embodiments here lies is the different compressibility of the stripes of the interdigitated structure. This alleviates the mechanical stresses.

The different compressibility may result from using different materials. For example, one material may be one a lithium-based compound by itself, and another material may be the lithium-based compound mixed with a more compressible material. In another example, the materials may be the same compound, but one is slightly altered to be more porous. The more porous structure is more compressible. Both of these embodiments will be referred to as having different types of stripes. In the second embodiment above, the materials may be the same, but the alteration of it to be more porous will be considered here to be a different type.

In the embodiment in which the second type results from mixing in a more compressible material, the first type is manufactured of a material that is of a lower compressibility. The second, more compressible type may result from addition of a styrene butadiene rubber or other compressible material. By using stripes of different compressibility, the mechanical stresses caused by the expansion and contraction of the materials is relieved, while maintaining the ability of the material to create pore channels or porous structure.

In the embodiment where one type of stripe is denser and the other is more porous, the more porous stripes may result from an alteration of a same material used in both stripes. For example, a first type may be introduced into the co-extrusion print head at a first density. The second type may be the same as the first material, but is mixed with more solvent than the first material, such that the final stripe is more porous. It is also possible that the flow of material in the channel for the second type is controlled to produce stripes that are more porous. Again, the resulting structure will be referred to have interdigitated stripes of different types, where the same material having different densities may be referred to here as two different materials.

The two active materials are then extruded together using a co-extrusion device or print head, either the ones discussed above or another type. Once the materials are in place on the substrate, the solvent is removed, leaving the active materials in their respective places on the substrate. The battery is then finished by providing a separator and an anode.

One of the goals of the process is to provide dispersed particle sizes with interstitial spacing for formation of the pore channel or porous structure in the stripes of material having a lower concentration of the active material. This process may occur in several different ways. This discussion will address a room-temperature method and a high-temperature process. For a room temperature embodiment, the active cathode materials may consist of lithium cobalt oxide (LCO), lithium nickel cobalt manganese oxide (NCM), or a mixture of the two. Other materials may include lithium nickel cobalt aluminum oxide (NCA), lithium manganese oxide (LMO), lithium iron phosphate (LFeP). While many of the active materials here are lithium, these techniques can be applied to sodium ion batteries and magnesium ion batteries. The anode materials may be graphite and lithium titanate (LTA). In this particular embodiment, the material is mixed with a binder, such as polyvinylidene fluoride (PVDF), and the solvent consists of n-methyl-2-pyrrolidone (NMP). A dispersant in the form of polyoxyethylen oleyl ether, also known as Brij 98, may also be added. Carbon black may be added to increase electrical conductivity.

These materials are formed into two different slurries, where one slurry has an active material with a higher concentration than the other. One of the materials may have an added component that makes it more compressible than the other material. The co-extrusion device deposits the slurries onto a substrate and then the solvent is removed. In the room temperature embodiment the solvent is dried out of the slurries, leaving the materials in their respective positions.

In a high temperature embodiment, the active material consists of LCO. The binder used in this embodiment is an ethylcellulose resin, such as Ethocel™ manufactured by the Dow Chemical company. The solvent used in this particular embodiment consists of a mixture of diethyl sebacate and butyl carbitol. The dispersant may consists of linolenic acid. The mixtures are deposited and then sintered at high temperature to remove the solvent and leave the materials.

In either case, the resulting materials have a wide distribution of particle sizes in the lower concentration stripes. This allows the formation of the pore channels or porous structure as microstructures in the electrodes. The resulting electrodes have highly controlled microstructures rendering a fast lithium ion diffusion path, resolving the electrolyte depletion problem so that high energy and power electrodes are fabricated. These electrodes demonstrate much better electrochemical performance than conventional battery electrodes.

Figure 6:
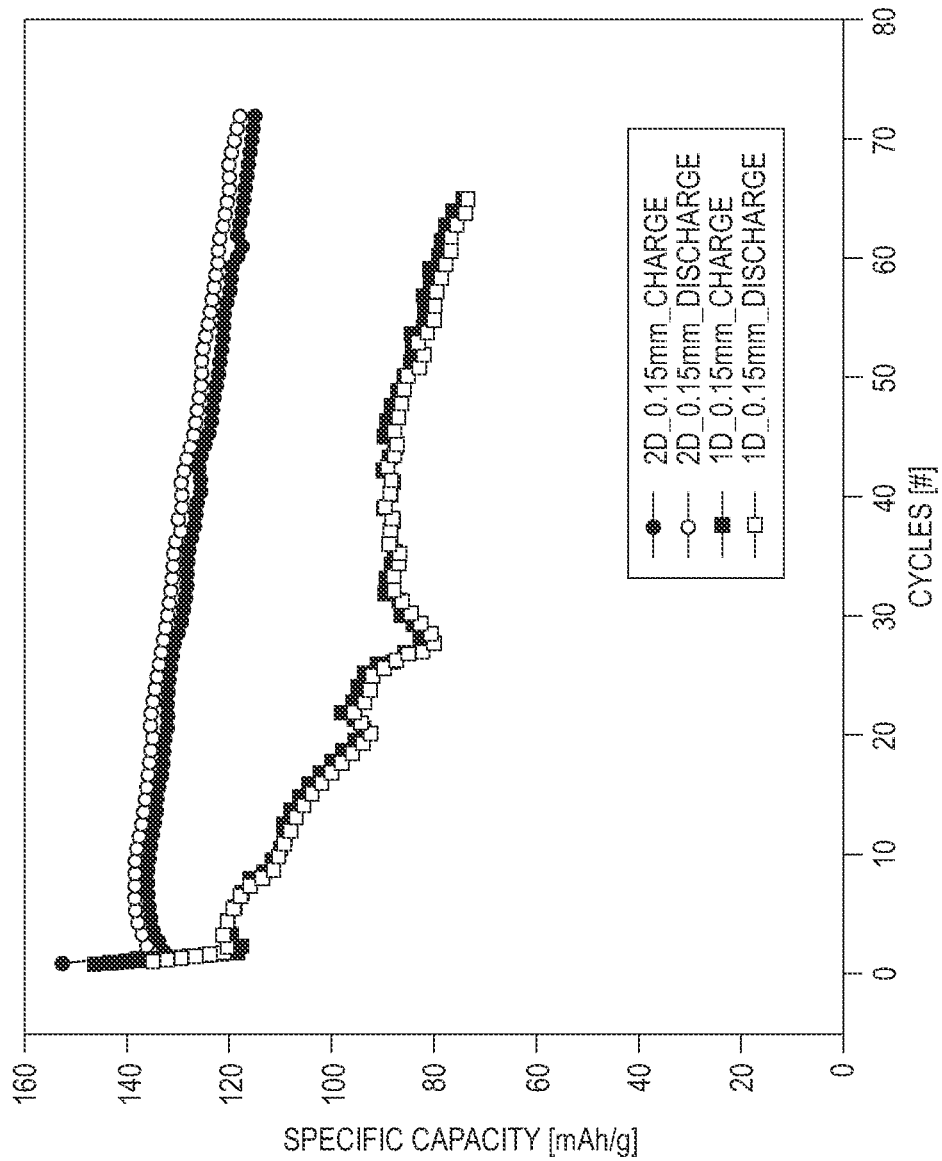
FIG. 6 shows a graph of specific capacity of a battery as a function of cycle number for conventional and modified electrodes.

FIG. 6 shows a comparison of the specific capacity of batteries versus the number of cycles. The top two curves are for a "2D" battery, one having interdigitated electrodes, with the other two curves being for a conventional battery having a "1D" cathode. The specific capacity for the number of cycles is much improved with the modified structures in the interdigitated stripes the compressible material.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A battery, comprising:
   an anode;
   a separator adjacent the anode; and
   a cathode adjacent the separator opposite the anode, the cathode comprising:
   a layer of interdigitated, adjacent stripes of first and second types in contact with each other but not mixed, the first type formed of a material altered to form a porous structure, and the second type being denser than the first type.

2. The battery of claim 1, further comprising current collectors adjacent to the anode and the cathode opposite the separator.

3. The battery of claim 1, wherein the first material has a higher lithium concentration than the second material.

4. The battery of claim 1, wherein the cathode comprises an active material of either lithium cobalt oxide or lithium nickel cobalt manganese oxide.

5. The battery of claim 1, wherein the cathode comprises an active material of one of: lithium nickel cobalt aluminum oxide (NCA), lithium manganese oxide (LMO), or lithium iron phosphate (LFeP).

6. The battery of claim 1, wherein the anode comprises interdigitated stripes of materials, one of the materials forming a pore channel.

7. The battery of claim 6, wherein the anode comprises interdigitated stripes of two different types, one of the types being more porous than the other type.

8. A battery, comprising:
   an anode;
   a separator adjacent the anode; and
   a cathode adjacent the separator opposite the anode, the cathode comprising:
   a layer of interdigitated, adjacent stripes of first and second types in contact with each other but not mixed, the first type formed of a material altered to form a porous structure, and the second type being denser than the first type.

* * * * *